(12) United States Patent
Kahn et al.

(10) Patent No.: US 11,477,028 B2
(45) Date of Patent: Oct. 18, 2022

(54) PREVENTING ACCOUNT LOCKOUT THROUGH REQUEST THROTTLING

(71) Applicant: Pulse Secure, LLC, San Jose, CA (US)

(72) Inventors: Clifford E. Kahn, Westford, MA (US); Siva Kumar K, Virat Nagar (IN); Brett Littrell, Fremont, CA (US)

(73) Assignee: Pulse Secure, LLC, San Jose, CA (US)

( * ) Notice: Subject to any disclaimer, the term of this patent is extended or adjusted under 35 U.S.C. 154(b) by 60 days.

(21) Appl. No.: 16/795,359

(22) Filed: Feb. 19, 2020

(65) Prior Publication Data

US 2020/0329025 A1    Oct. 15, 2020

Related U.S. Application Data

(60) Provisional application No. 62/834,274, filed on Apr. 15, 2019.

(51) Int. Cl.
| | |
|---|---|
| *H04L 29/06* | (2006.01) |
| *H04L 9/32* | (2006.01) |
| *H04L 9/06* | (2006.01) |
| *H04L 9/40* | (2022.01) |
| *G06F 21/31* | (2013.01) |

(52) U.S. Cl.
CPC ............ *H04L 9/3226* (2013.01); *G06F 21/31* (2013.01); *H04L 9/0643* (2013.01); *H04L 63/083* (2013.01); *H04L 63/0815* (2013.01); *H04L 63/0838* (2013.01); *G06F 2221/2131* (2013.01); *G06F 2221/2135* (2013.01)

(58) Field of Classification Search
CPC . H04L 9/3226; H04L 9/0643; H04L 63/0815; H04L 63/083; H04L 63/0838; G06F 21/31; G06F 2221/2131; G06F 2221/2135
See application file for complete search history.

(56) References Cited

U.S. PATENT DOCUMENTS

| | | |
|---|---|---|
| 5,990,810 A | 11/1999 | Williams |
| 6,470,329 B1 | 10/2002 | Livschitz |
| 7,080,077 B2 | 7/2006 | Ramamurthy et al. |
| 7,366,761 B2 | 4/2008 | Murray et al. |
| 7,600,125 B1 | 10/2009 | Stringham |

(Continued)

OTHER PUBLICATIONS

Bo Lu et al., A Measurement Study of Authentication Rate-Limiting Mechanisms of Modern Websites, Dec. 2018, ACM, pp. 89-100. (Year: 2018).*

(Continued)

*Primary Examiner* — Jeffrey C Pwu
*Assistant Examiner* — Fahimeh Mohammadi

(57) ABSTRACT

A server to provide single sign on services. The server includes a processor and a memory storing an attempt table. The server, in response to receiving a first password for a user account, forwards the first password to an authentication device. The server determines that the first password is not valid for the user account. The server stores the first password in association with the user account in the attempt table. In response to receiving a second password for the user account, the server determines whether the second password matches the first password. When the second password does not match the first password, the server forwards the second password to the authentication device.

20 Claims, 7 Drawing Sheets

(56) References Cited

U.S. PATENT DOCUMENTS

| | | |
|---|---|---|
| 7,734,792 B2 | 6/2010 | Kumar et al. |
| 7,734,826 B2 | 6/2010 | Brown et al. |
| 7,849,507 B1 | 12/2010 | Bloch et al. |
| 7,873,695 B2 | 1/2011 | Clegg et al. |
| 8,122,493 B2 | 2/2012 | Drako et al. |
| 8,260,742 B2 | 9/2012 | Cognigni et al. |
| 8,490,162 B1* | 7/2013 | Popoveniuc ............ H04L 63/08 726/5 |
| 8,554,933 B2 | 10/2013 | Delos Reyes et al. |
| 8,621,556 B1 | 12/2013 | Bharali et al. |
| 8,762,554 B2 | 6/2014 | Trace et al. |
| 8,768,895 B2 | 7/2014 | Patterson et al. |
| 8,831,014 B2 | 9/2014 | Koodli et al. |
| 8,977,728 B1 | 3/2015 | Martini |
| 9,124,627 B2 | 9/2015 | Bharali et al. |
| 9,137,211 B2 | 9/2015 | Parla et al. |
| 9,313,130 B2 | 4/2016 | Takenaka et al. |
| 9,319,377 B2 | 4/2016 | Vempati et al. |
| 9,602,411 B2 | 3/2017 | Lapidous et al. |
| 9,692,725 B2 | 6/2017 | Venkatraman et al. |
| 9,699,173 B1* | 7/2017 | Roth ...................... G06F 21/31 |
| 10,404,683 B2* | 9/2019 | Johansson ............. H04L 63/102 |
| 10,423,775 B1* | 9/2019 | Kane-Parry ............ G06F 21/46 |
| 10,819,700 B1* | 10/2020 | Perlman ................ G06F 21/316 |
| 2001/0010543 A1 | 8/2001 | Ward et al. |
| 2003/0005306 A1 | 1/2003 | Hunt et al. |
| 2004/0093519 A1* | 5/2004 | Grobman ........... H04L 63/1458 726/5 |
| 2005/0004954 A1 | 1/2005 | Soule, III |
| 2006/0130140 A1* | 6/2006 | Andreev ............ H04L 63/1458 726/23 |
| 2012/0102226 A1 | 4/2012 | Hopmann et al. |
| 2013/0198834 A1* | 8/2013 | Kirsch ................ H04L 63/0823 726/17 |
| 2015/0199500 A1* | 7/2015 | Jagtap .................... G06F 21/45 726/1 |
| 2015/0271132 A1 | 9/2015 | Erb |
| 2015/0281210 A1* | 10/2015 | Weisberger ........... H04L 63/083 726/28 |
| 2016/0308989 A1* | 10/2016 | Lim ..................... H04L 45/745 |
| 2017/0108018 A1* | 4/2017 | Whitby .................. E21B 34/16 |
| 2017/0208075 A1* | 7/2017 | Kerametlian .......... G06F 21/31 |
| 2019/0132323 A1* | 5/2019 | Williams .............. H04L 63/083 |
| 2019/0165944 A1* | 5/2019 | Sun ....................... H04L 9/3271 |
| 2020/0110870 A1* | 4/2020 | Girdhar ................ G06F 21/316 |
| 2020/0134165 A1* | 4/2020 | Boodaei ................ H04L 63/083 |
| 2020/0301765 A1* | 9/2020 | Vary ........................ G06F 9/52 |

OTHER PUBLICATIONS

Vipul Goyal et al., CompChall: Addressing Password Guessing Attacks, May 16, 2005, IEEE, vol. II, pp. 1-6. (Year: 2005).*

Anushka, K P B et al., Case study on exploitation, detection and prevention of User Account DoS through Advanced Persistent Threats, Jan. 11, 2016, IEEE, pp. 190-194. (Year: 2016).*

R. Kirushnaamoni, prevent account lockout AND invalid password, Apr. 29, 2013, IEEE, pp. 1-6. (Year: 2013).*

Tschabitscher, "How to Create App-Specific Passwords in Gmail," Lifewire, Retrieved Aug. 17, 2020 from: https://www.lifewire.com/get-a-password-to-access-gmail-by-pop-imap-2-1171882, Nov. 11, 2019, 12 pp.

Extended Search Report from counterpart European Application No. 20159902.4, dated Aug. 14, 2020, 7 pp.

* cited by examiner

PREVENTING ACCOUNT LOCKOUT THROUGH REQUEST THROTTLING

RELATED APPLICATIONS

This application claims the benefit of U.S. Provisional Patent Application No. 62/834,274, filed Apr. 15, 2019, which is incorporated by reference herein in its entirety.

TECHNICAL FIELD

This disclosure relates to computer networks, and more particularly, to user authentication for computer networks.

BACKGROUND

Computing devices perform user authentication to ensure that only authorized users are permitted access to various computer resources. Typically, authentication includes a user providing a username and password. A computing device receives the username and password and determines whether the received username and password match stored data representing a previously established username and password. For example, the computing device may include a database that stores a hash of the password associated with the username, which acts as a key entry in a table.

Malicious users have developed strategies to attempt to gain unauthorized access to computing devices. One malicious attack includes a dictionary attack, in which a malicious user submits a large number of passwords associated with a particular username, where the large number of passwords is selected from a dictionary of commonly used passwords. To thwart such an attack, many authentication systems impose a lockout on user accounts for which too many incorrect password attempts are made. In particular, authentication systems lock a user's access for a period of time if more than a configurable number of failed password attempts are made to access services for which access control is supported by the authentication sources.

In some examples, an identity provider (IDP) communicates a user's password to an authentication source when the user attempts to access a service that is controlled or hosted by a service provider (SP). Upon receiving a failed authentication message from the authentication source in response to the IDP sending a bad password, i.e., a password that does not match the user's password recorded by the authentication source, the IDP may re-transmit an authentication request that includes the bad password to the authentication source multiple times. In some cases the IDP re-transmits a bad password to the authentication source when the SP re-transmits an authentication request including the bad password to the IDP. After receiving the bad password, or multiple different bad passwords, multiple times, the authentication source locks the user's access.

In some configurations a user's access can only be unlocked through administrator intervention or by a user providing additional information and, in some cases, resetting their password. An authentication source may lock a user's access in response to legitimate security threats, for example in response to a brute force hacking attempt whereby a malicious user attempts to gain access to a resource by iteratively guessing a user's password and submitting multiple different guessed passwords. However, an authentication source may also lock a user's access in response to more benign password failures, for example, when a user changes a password registered with the authentication source but fails to update the corresponding password stored on a user device. Another benign password failure may occur when the user changes both the authentication source password and the user device password, but the update to the authentication source password is not fully implemented by the authentication source prior to the user making a resource access attempt.

SUMMARY

In general, this disclosure describes techniques for preventing lockout of a user's account for benign password attempts. The techniques of this disclosure may be used to distinguish between true attacks and benign password failures. The techniques of this disclosure may therefore be used to prevent account lockouts in response to benign password failures while maintaining protection against truly malicious activity.

An example method includes determining that a received first password for a user account is not valid for the user account. The method also includes, in response to determining that the first password is not valid, incrementing a lockout counter associated with the user account. Additionally, the method includes determining that a received second password for the user account is the same as the first password, and in response to determining that the second password is the same as the first password, preventing incrementing of the lockout counter.

An example server provides a single sign on service. The server includes memory storing an attempt table and a processor. The server, in response to receiving a first password for a user account, forwards the first password to an authentication device. The server determines that the first password is not valid for the user account. The server stores the first password in association with the user account in the attempt table. In response to receiving a second password for the user account, the server determines whether the second password matches the first password. When the second password does not match the first password, the server forwards the second password to the authentication device.

An example non-transitory computer readable medium comprises instructions that, when executed, cause a server to, in response to receiving a first password for a user account, forward the first password to an authentication device, determine that the first password is not valid for the user account, and store the first password in association with the user account in the attempt table. The instructions also cause the server to, in response to receiving a second password for the user account, determine whether the second password matches the first password, and when the second password does not match the first password, forward the second password to the authentication device.

The details of one or more examples are set forth in the accompanying drawings and the description below. Other features, objects, and advantages will be apparent from the description and drawings, and from the claims.

DETAILED DESCRIPTION

Figure 1:
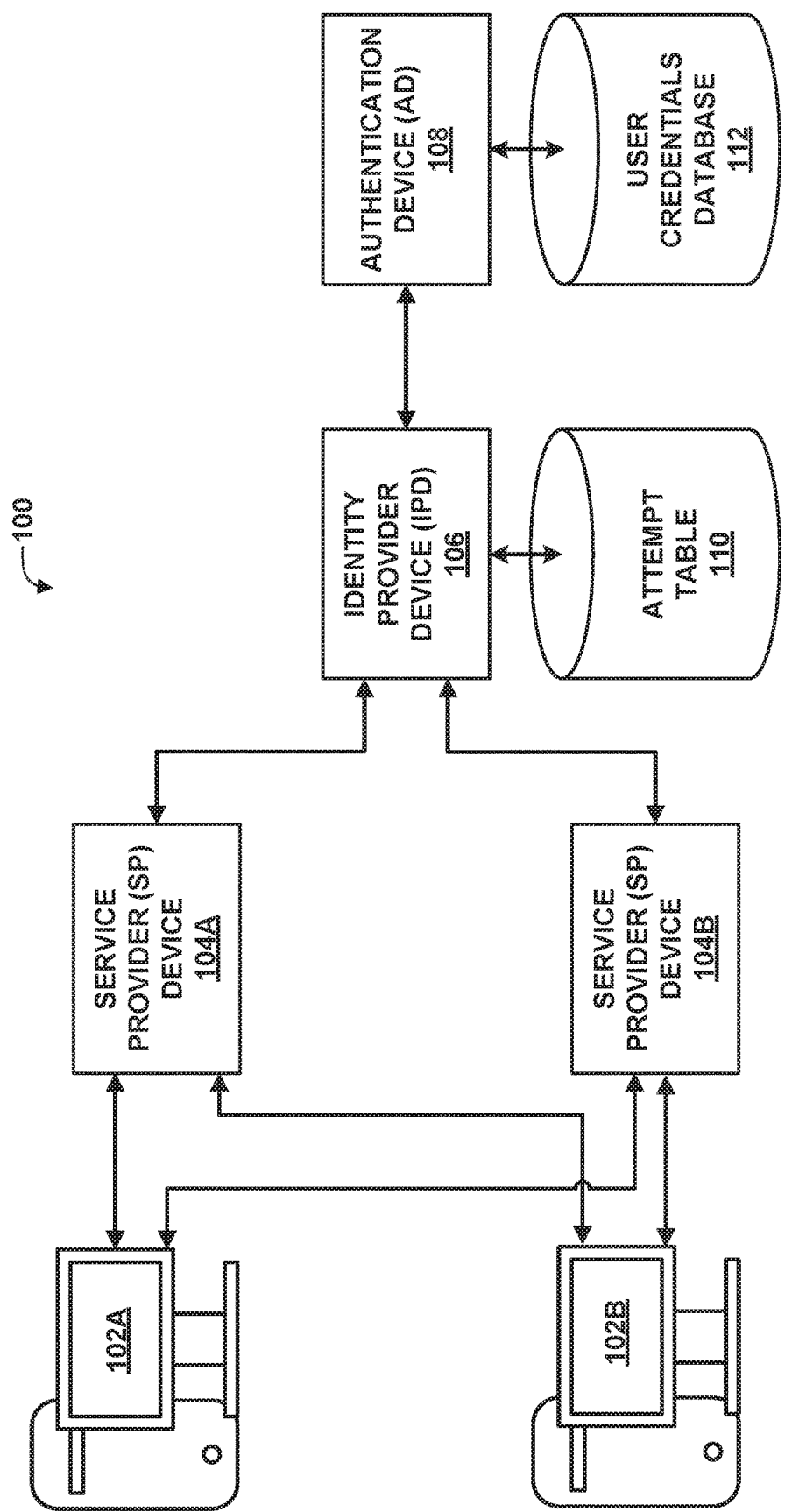
FIG. 1 is a block diagram illustrating an example network including user devices, service provider devices, an identity provider device, and an authentication device, which may be configured to perform the techniques of this disclosure.

Benign password failures happen when a true user of an account attempts to log into the account but supplies the incorrect password. For example, a user may change a password registered with the authentication source but fail to update the corresponding password stored on a user device. As another example, benign password failure may occur when the user changes both the authentication source password and the user device password, but user device attempt to access the account before the authentication source password is implemented by the authentication source. One of these example failures can cause multiple requests with the wrong password to be sent to the authentication source in a short period of time which in turn may trigger an account lock. For example, a client on a user's mobile device and a client on a user's laptop may attempt to access a protected network resource (such as an email server) in a short period of time. Thus, these failures may cause a user to be locked out of their account until some intervention, such as resetting the password or manually unlocking the account by an administrator. These interventions can use network resources to resolve and cause frustration to a user.

As described below, authentication requests are filtered (sometimes referred to as "throttled") before reaching an authentication device to distinguish between malicious attacks and benign password failures. The system reduces and/or eliminates benign password failures that result in an account lock, while allowing malicious attacks to trigger the defensive measures of the authentication device. Users registers usernames and passwords with the authentication source. An identity provider device provides an authentication service for authenticating users and is communicatively coupled to the authentication source. The identity provider device receives username and passwords from service providers that received them from user devices. The identity provider device then requests authentication from the authentication service. The authentication service communicates either a verification message or a fail to verify message (sometimes referred to as a "failure message") to the identity provider device based on the comparison. In one attack mitigation strategy, when a failure message is generated, the authentication service may increment a lockout counter. When the lockout counter satisfies (e.g., is greater than or equal to, etc.) a failure threshold, the authentication service may lockout the account until an intervention is taken.

The received message is forwarded to the service provider that requested the authentication. The identity provider device prevents the authentication service from, for example, incrementing the lock counter because of the same failed password. In response to receiving a failure message, the identity provider device stores the password associated with the failure. The failed password is stored associated with the username on a failure table as, for example, a one-way hash of the failed password. In some examples, the failed password is stored for a limited amount of time (e.g., thirty seconds, a minute, two minutes, etc.). Additionally, in some examples, the failure table may store multiple failure passwords such that the system is more user error tolerant. Upon receiving another request for authentication with the same username, the identity provider device compares the accompanying password (e.g., a one-way hash of the accompanying password, etc.) to the failed password (e.g., a one-way hash of the failed password, etc.) stored in the database. If the two passwords match, the identity provider device does not forward the authentication request to authentication service. If the two passwords do not match, the identity provider device forwards the authentication request to authentication service.

FIG. 1 is a block diagram illustrating an example network 100 including user devices 102A and 102B (collectively referred to as "user device 102"), service provider (SP) devices 104A and 104B (collectively referred to as "SP device 104"), identity provider (IDP) device 106, authentication device (AD) 108, attempt table 110, and user credentials database 112, which may be configured to perform the techniques of this disclosure. A user may user multiple user devices 102 to access services provided on SP 104. For example, the same user may use each of a desktop computer at an office, a desktop computer at home, a laptop, a tablet, and a smart phone. Such devices may each access a variety of SP devices 104 for the same or different services, e.g., based on a location of the user and the user device at a particular time when the user is accessing the services.

In general, SP device 104 provides one or more services. Such services may include various software applications (e.g., email, word processing, spreadsheet programs, database programs, presentation programs, or the like), network services such as online shopping services, media streaming services (e.g., audio and/or video streaming), or the like. Users access the services provided by SP device 106 using one or more user devices 102. For example, a user may access a Software as a Service (SaaS) service operating on SP device 106A using user device 102A (e.g., a smartphone, a tablet, a laptop, etc.) and user device 102B (e.g., a desktop, a laptop, a workstation, etc.). SP device 104 provides such services to authorized users that provide valid credentials (e.g., a username and password, etc.). These services may require the user device 102 to provide credentials from time-to-time (e.g., when logging into the service after disconnecting, periodically while connected, etc.). For example, a service may require authorization when the user device 102 initially connects and may require a renewed authorization every 15 minutes thereafter. The authentication service may provide single sign on (SSO), in which a user of user device 102 may provide a single user identifier (ID) (e.g., a username, etc.) and password to gain access to a variety of services provided by, e.g., one or more SP devices 104. In such a manner, SP devices 104 may request multiples authorization for the same credentials over a relatively short period of time.

In the illustrated example, the SP device 104 is communicatively coupled to IDP device 106. IDP device 106 provides authentication services for authenticating users of the SP device 104, such as a user of user device 102. Additionally or alternatively, in some example, SP device 104 may itself provide an authentication service for authenticating users. IDP device 106 acts as an intermediary between the authorization requests send by SP device 104 and authentication device 108. The authentication service of IDP 106 may include an authentication, authorization, and accounting (AAA) service. User device 102, SP device 104, and IDP device 106 may be configured according to one or more of a variety of authentication services and authentication protocols, such as Remote Authentication Dial-In User Service (RADIUS), Diameter, Lightweight Directory Access Protocol (LDAP), Security Assertion Markup Language (SAML), Open Authorization (OAuth), OAuth 2.0, Terminal Access Controller Access-Control System Plus (TACACS+), Kerberos, or the like. In some examples, user device 102 (or another device between user device 102 and SP device 104, such as a gateway device, not shown in FIG. 1) may execute an Enhanced Client or Proxy (ECP) profile, e.g., of SAML.

In the illustrated example, IDP device 106 is communicatively coupled to authentication device 108. In general, to authenticate a user of user device 102, IDP device 106 receives a username and password for the user via SP device 104. In some examples, user device 102 may cache the username and/or password such that the user need not enter the username and/or password. IDP device 106 sends a received username and password to authentication device 108, which determines whether the password is valid for the username, e.g., by comparing data for a received password associated with an account for the user to data for a stored password associated with the account. Authentication device 108 may hash data for the received and stored passwords using various hashing algorithms, such as salted hashes, in which a strong random number is used to salt the hash to provide hash randomization.

Authentication device 108 determines whether to authenticate a user based on comparing a password associated with a username in an authorization request to a password stored in associated with the username in, for example, user credentials database 112. IDP device 106 receives user credentials (e.g., usernames and passwords) for user accounts from various devices, such as user device 102 via SP device 104. In response to receiving user credentials for a user account, IDP device 106 may initially submit the user credentials to authentication device 108 to determine whether the user credentials are authentic. Authentication device 108 may determine whether the user credentials are authentic, e.g., by identifying a stored password (or stored data representative of the password, such as a hashed password) in user credentials database 112. User credentials database 112 may include a table including usernames as key values and data representing passwords (e.g., hashed versions of passwords and salt values for the hashes) in rows corresponding to the key values. When the received password matches the expected password, authentication device 108 responds with a verification message. Conversely, when the received password does not match the expected password, authentication device 108 responds with a failure message. Authentication device 108 may further be configured to lock a user account after a threshold number of password attempts have failed. In some examples, authentication device 108 includes a lockout counter for each user identifier. When authentication device 108 sends a failure message, it also increments the associated lockout counter. When the lockout counter satisfies (e.g., is greater than or equal to) a lockout threshold, authentication device 108 locks (e.g., prevents access to) the associated user account until an intervention clears the lockout. When authentication device 108 sends a verification message, it may reset the associated lockout counter.

Password failures may result from a variety of circumstances. For example, a user may have recently changed their password and the new password may not have propagated through the computer system yet (e.g., to authentication device 108, IDP device 106, and/or to a cache of a browser of user device 102 that automatically provides the user password on behalf of the user). Alternatively, the user may have recently changed their password and forgotten that the password had been changed and entered a previous password. Furthermore, the user account may be under attack by a malicious user attempting to gain illicit access to the user account, e.g., through a dictionary attack (which the lockout is designed to thwart).

In cases where a legitimate user has forgotten their password or is using a cached password of user device 102 that is not correct, lockout of the user's account may be said to be a false positive lockout, because the lockout is not actually thwarting a malicious user attack. This is as opposed to cases where a malicious user is in fact attempting to access the user's account and a lockout results. False positive lockouts tend to upset users, who must then either wait until a lockout period has expired, and possibly change passwords, potentially with the assistance of trusted administrators such as help desk administrators of an IDP system including IDP device 106 and/or authentication device 108. Accordingly, false positive lockouts can increase human user downtime while attempting to gain legitimate access to SP device 104, as well as increased network traffic and processing by and between user device 102, SP device 104, IDP device 106, and authentication device 108.

The techniques of this disclosure may reduce false positive lockouts. As a result of reducing false positive lockouts, the techniques of this disclosure may improve the performance of user device 102, SP device 104, IDP device 106, and authentication device 108, as well as reduce bandwidth consumed within network 100 for communications between these devices, due to resolving the false positive lockout. Furthermore, these techniques may improve experiences by both users and administrators. In this manner, these techniques may improve both computing devices and the field of network security, in particular, authentication and authorization.

The device operating the authentication service (e.g., IDP device 106) detects scenarios that are indicative of resulting in false positive lockouts. For ECP-based SAML authentication, for example, SP device 104 directly contacts IDP device 106 for authentication, i.e., to send ECP requests on behalf of user device 102. If the ECP request results in an authentication failure, SP device 104 may submit multiple ECP requests including the same user credentials, which may result in a false positive lockout. As another example, if a user of user device 102 changes a password on authentication device 108, but a device using ECP to access services of SP device 104 (e.g., user device 102, a gateway device, or other such device) is not updated with the new password, the ECP requests would be sent with the old password. In that case, the authentication device 108 would determine that authentication has failed, and IDP device 106 may be flooded with ECP requests continually. In such an example, since IDP device 106 sends all requests to authentication device 108, authentication device 108 would lock the user account when the configured threshold number of wrong password attempts has been exceeded.

IDP device 106, SP device 104, gateway devices, and/or user devices themselves may be configured to throttle authentication requests to prevent account lockout, while permitting authentication requests submitted as part of a brute force attack to be submitted to prompt the lockout. IDP device 106, SP device 104, and/or authentication device 108 may further be configured to generate reports representing, for example, numbers of accounts that have been locked out and/or a number of failed login attempts (excluding password duplications), e.g., to determine whether or not a brute force attack is being conducted against multiple user accounts. IDP device 106, SP device 104, and/or authentication device 108 may further generate an alert to be sent to an administrator to warn of such an ongoing brute force attack, e.g., if a number of account lockouts over a configured period of time exceeds a threshold.

If the authentication service receives multiple authentication requests with the same password, the authentication service avoids submitting authentication requests with repeated passwords to authentication device 108. Thus, authentication device 108 would not receive multiple authentication requests including the same password, thereby preventing lockout by preventing incrementing of a lockout counter associated with the user account. Accordingly, brute force attacks (also referred to as dictionary attacks) would still cause lockout.

IDP device 106 determines that the submitted password is not valid for the user account in response to receiving the failure message from authentication device 108. IDP device 106 stores the user credentials (e.g., username and password, or a salted hashed version thereof, along with the salt value) in attempt table 110. Subsequently, if IDP device 106 receives an authentication request associated with the username, IDP device 106 compares the password (e.g., or a hash thereof) in the authentication request to the password stored in user attempt table 110. If the new password is the same as the password stored in attempt table 110, IDP device 106 does not forward the authentication request to authentication device 108. In this manner, IDP device 106 may prevent authentication device 108 from incrementing the lockout counter for repeated instances of the same invalid password, thereby avoiding false positive lockout of the user account.

In some examples, IDP device 106 stores a salted hashed version of a password. To salt the hash, IDP device 106 used a salt value, such as a strong random number, when the password was hashed, and also use the salt value as an input to a hash function applied to the password. In this manner, when IDP device 106 subsequently receives a new authentication request associated with the user account, IDP device 106 retrieves the previous salt value and apply the hash function using the salt value to the password in the new authentication request to construct a new salted hashed password. IDP device 106 compares the new salted hashed password to the stored salted hashed password in attempt table 110 to determine whether the newly received password is the same as the previously received password. In some examples, IDP device 106 stores data representing multiple invalid passwords for a given user account in attempt table 110, where the data for each of the invalid passwords may be salted and hashed. Thus, IDP device 106 may store individual salt values for each of the multiple invalid passwords. In such examples, the first time one of the invalid passwords is used, the corresponding authentication request is forwarded to authentication device 108. Thus, in some examples, IDP device 106 may store multiple invalid passwords up to the lockout threshold of authentication device 108.

Accordingly, in some examples, for each unique password received for a given user account, IDP device 106 stores a salted hashed version of the password in attempt table 110. IDP device 106 stores the salt values used to construct the salted hashed versions of the passwords. Thus, IDP device 106 applies the hash function and corresponding salt value for each stored password to each newly received password for a given user account to determine whether the newly received password is the same as any of the stored passwords for the user account. If the newly received password is the same as any of the stored passwords for the user account, IDP device 106 avoids submitting the newly received password to authentication device 108.

In some examples, the invalid passwords are stored in attempt table 110 temporarily. In some such examples, invalid password(s) for a user account is associated with a timer that begins when a failure message is received from authentication device 108. When the timer expires, IDP device 106 deletes the associated password(s). Thus, if the password is received in an authorization request after the timer, IDP device 106 forwards the authentication request. In some examples, the time limit of the timer is set to a duration that takes into account propagation time between changing a password authentication device 108 and having the change implemented. Alternatively or additionally, in some example, the time limit of the timer is set to a duration that provides an opportunity for the user to change the passwords stored on the endpoint devices 102. For example, the time limit of the timer may be thirty seconds, one minute, two minutes, etc.

IDP device 106 may prevent false positive lockouts by preventing the same password from being sent to authentication device 108. However, authentication device 108 can still successfully lock out accounts being subjected to a dictionary attack by a malicious user, because IDP device 106 will continue to submit new passwords to authentication device 108.

Although the techniques described above are attributed to IDP device 106 for purposes of example and explanation above, it should be understood that in other examples, other devices may perform these or similar techniques. For example, SP device 104 may also include a user credentials database (not shown in FIG. 1) and perform the techniques attributed to IDP device 106. Similarly, user device 102 may itself perform these or similar techniques.

Moreover, in some examples, authentication device 108 may implement techniques as described above and/or IDP device 106 may be incorporated into authentication device 108. That is, in some examples, authentication device 108 may store both actual valid passwords for a user account and failed attempted passwords in user credentials database 112. In such examples, authentication device 108 compare newly received passwords to the actual valid password to determine whether to authenticate the user account, and if the password is invalid, compare the newly received password to stored failed attempted passwords. When the newly received password is not valid and is not stored as a failed password, authentication device 108 increments the lockout counter. Otherwise, if the newly received password is a filed password that is stored in, for example, user credentials database 112, authentication device 108 does not increment of the lockout counter.

In some examples, one or more of the user device 102, SP device 104, and/or IDP device 106 includes a mechanism as described above to identify and stop duplicate passwords (e.g., ECP requests) from being sent to authentication device 108. That is, these devices cache data representative of attempted passwords for a user account when a series of authentication requests (e.g., ECP requests) fails for the same user over a time duration (e.g., a minute). These devices may associate the invalid (wrong) password with a time within which all authentication requests for the particular user using the same password will not be sent to authentication device 108.

In some examples, any of user device 102, SP device 104, and/or IDP device 106 include a user interface (UI) option for enabling password throttling. A UI option is provided for resetting such accounts that are blocked. In some examples, these devices further maintain a blocked table including a username, a password hash, a time at which the user was blocked, a time of a last authentication (e.g., ECP) request, a duplicate request count for the password, an expiration time, a user agent, and a realm value. The username field may correspond to a user account from a request packet, such as an ECP request packet. The password hash may correspond to the wrong password that failed authentication by authentication device 108. The time at which the user was blocked may represent the start time of a lockout, and may be used to determine when the user's account will be unlocked. The time of the last authentication request may correspond to a timestamp value of an ECP request packet. The duplicate request count may represent a total number of times the same password was received, overall or since the user account was locked out. The expiration time may represent the time until a password entry becomes valid. Such data may be stored in, e.g., attempt table 110.

In some examples, there are multiple such entries for each user account, up to a determined maximum number of entries (e.g., five). In some such examples, the entries are replaced in a first-in-first-out order. In some examples, the expiration time varies based on a number of authentication attempts over a time duration (e.g., one minute). For example, each incorrect password attempt may increase the time duration with diminishing returns. Alternatively, in some examples, the expiration time is set to a predetermined time, such as a minute. Before expiry, if a user attempts another password request with a duplicate password, the expiration time may be increased.

User device 102, SP device 104, IDP device 106, and authentication device 108 may each include one or more respective processors implemented in circuitry. Such processors may include one or more microprocessors, digital signal processors (DSPs), field programmable gate arrays (FPGAs), application specific integrated circuits (ASICs), or the like, alone or in any combination. Various processors may execute software instructions stored in memory units implemented in circuitry of these devices. Thus, the techniques of this disclosure may be realized in hardware, software, firmware, or a combination thereof. When realized in software or firmware, requisite hardware (such as a memory to store instructions and a processor to execute the instructions) may also be provided.

In this manner, each of user device 102, SP device 104, IDP device 106, and authentication device 108 represents an example of a computing device comprising one or more processors implemented in circuitry and configured to, in response to determine that the first password is not valid, incrementing a lockout counter associated with the user account; determine that a received second password for the user account is the same as the first password; and in response to determining that the second password is the same as the first password, prevent incrementing of the lockout counter.

Likewise, each of user device 102, SP device 104, and IDP device 106 represents an example of a computing device comprising one or more processors implemented in circuitry and configured to send a first password for a user account to an authentication device; determine that the authentication device indicated that the first password is not valid for the user account; determine that a received second password for the user account is the same as the first password; and in response to determining that the second password is the same as the first password, prevent sending of the second password to the authentication device.

The techniques of this disclosure may be used in a variety of use cases or scenarios. Various examples of such scenarios are described below, although the scenarios discussed below are merely examples and are not exhaustive.

Figure 2:
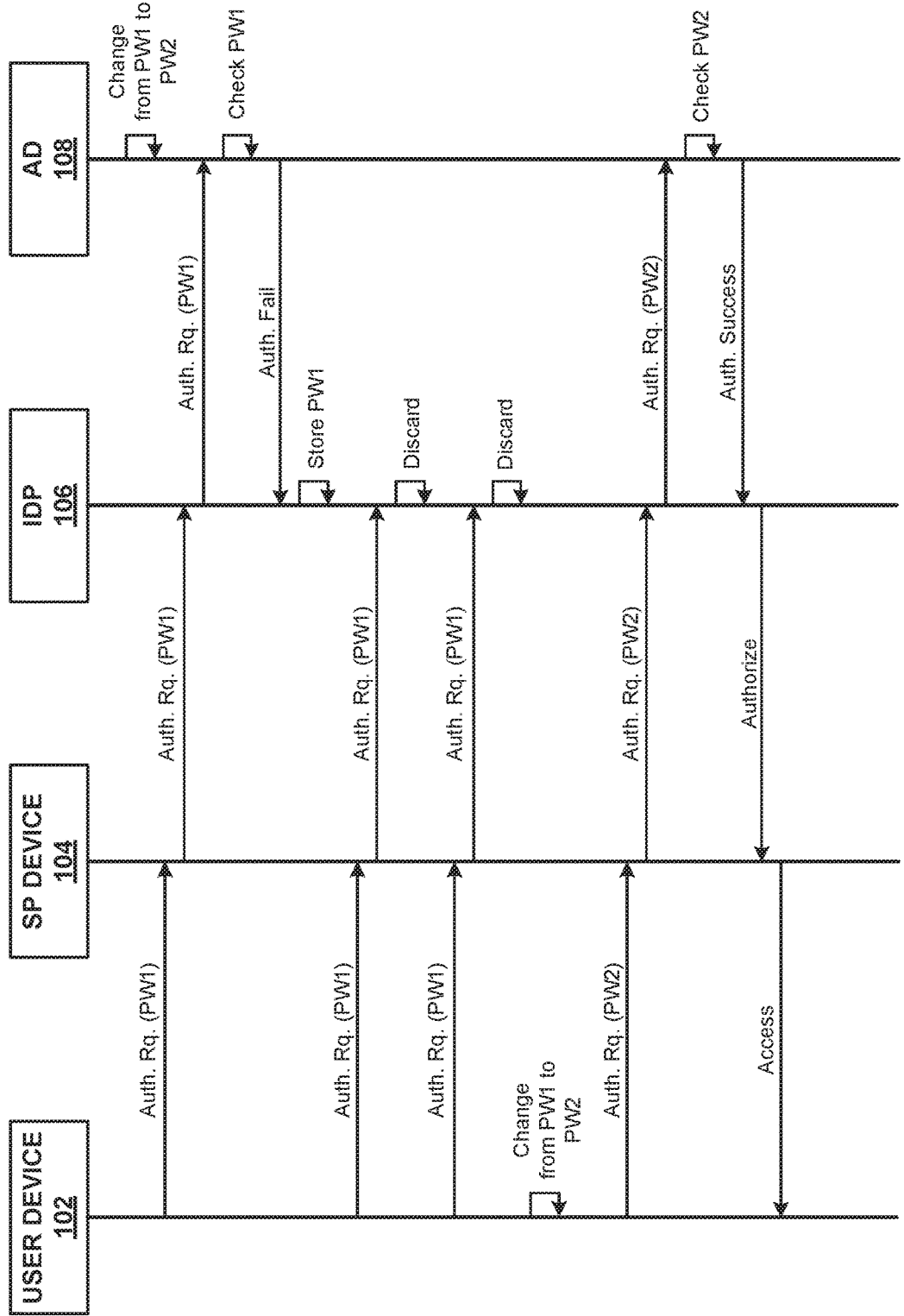
FIG. 2 is a block diagram illustrating an example of the network of FIG. 1 configured to perform the techniques of this disclosure in a first scenario.

FIG. 2 illustrates a scenario in which a password on authentication device 108 is changed for a user account (and stored in user credentials database 112), then later, a password cached on user device 102 is changed. In this scenario, initially, client device 102 sends the old (cached) password (PW1) to IDP device 106 via SP device 104. This causes IDP device 106 to forward the password (PW1) to authentication device 108. Since this is the first attempt, the authentication attempt fails (e.g., authentication device 108 sends a failure message). IDP device 106 stores the invalid password in association with the username (e.g., or a hash thereof) in the attempt table 110. SP device 104 send another authentication request with the same password to IDP device 106. For example, SP device 104 may resend the authentication request because it did not receive a SAML assertion. Alternatively or additionally, for example, SP device 106 may send another authentication request in response to receiving another request from user device 102. Alternatively or additionally, for example, multiple user devices 102A and 102B may have cached the same, old password when a user has changed their password as stored in user credentials database 112 with authentication device 108 such that each user device 102A and 102B independently send authentication requests with the incorrect password in a relatively short period of time.

IDP device 106 checks the password (PW1) of the new authentication request against the password(s) stored on attempt table 110 for the user. Because the IDP device 106 determines the new password to be a duplicate of the password on attempt table 110, IDP device 106 discards the authentication request and logs the attempt in, e.g., attempt table 110. Subsequently, SP device 104 may continue to generate the same authentication requests, and IDP device 106 may continue to block these requests having the same password. The user may change the password (PW2) that that user device 102 uses to match the password (PW2) stored in credential database 112. Because the subsequent authentication request includes a new password, IDP device 106 submits the authentication request to authentication device 108. In this example, authentication device 108 determines that the request is valid, because the password matches the password stored in user credentials database 112.

Figure 3:
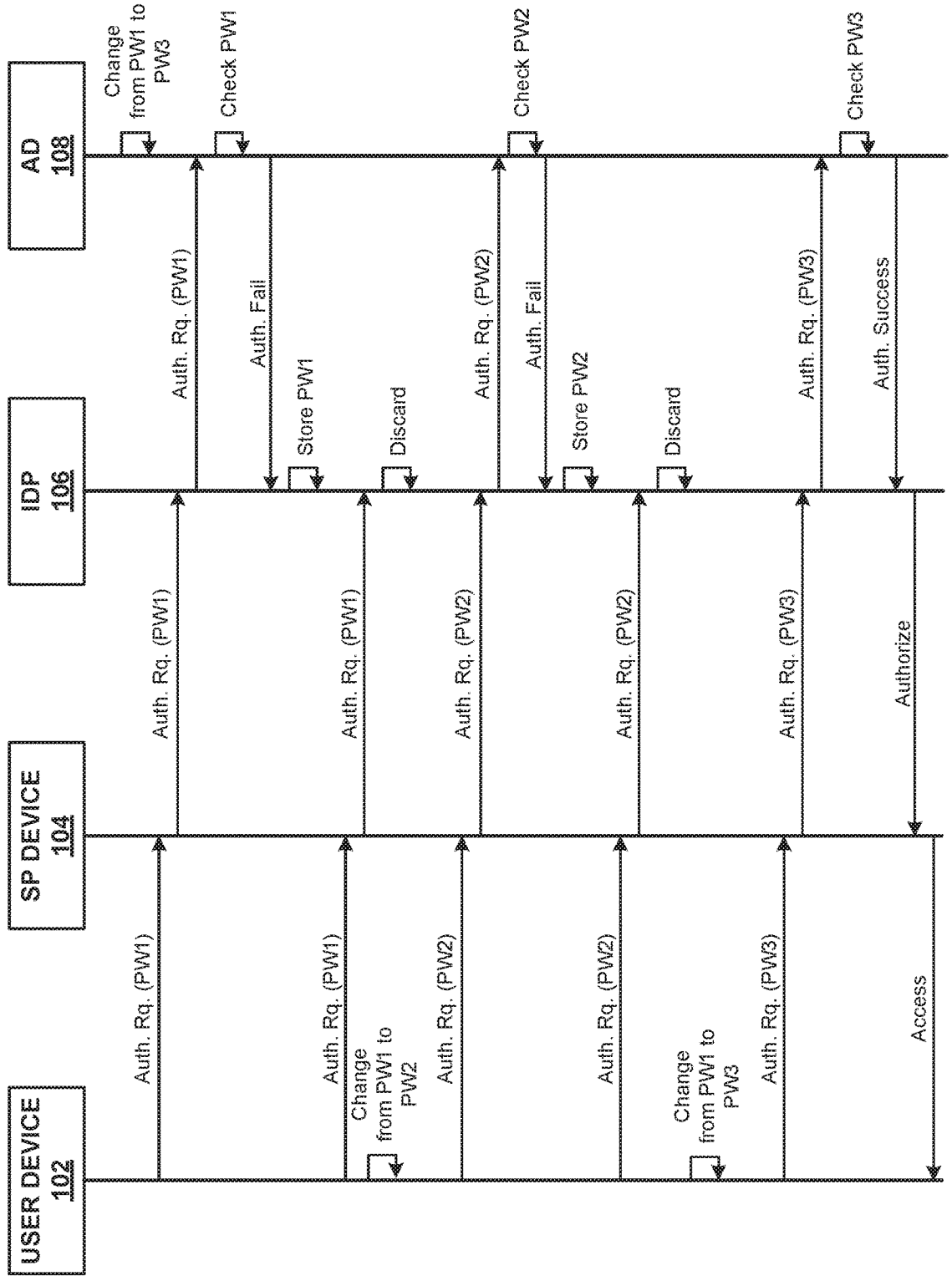
FIG. 3 is a block diagram illustrating an example of the network of FIG. 1 configured to perform the techniques of this disclosure in a second scenario.

FIG. 3 illustrates a scenario in which a password on authentication device 108 is changed for a user account (and stored in user credentials database 112), then later, a password cached on user device 102 is changed. In this scenario, initially, client device 102 sends the old (cached) password (PW1) to IDP device 106 via SP device 104. This causes IDP device 106 to forward the password (PW1) to authentication device 108. Since this is the first attempt, the authentication attempt fails (e.g., authentication device 108 sends a failure message). IDP device 106 stores the invalid password (PW1) in association with the username (e.g., or a hash thereof) in the attempt table 110. SP device 104 send another authentication request with the same password to IDP device 106. For example, SP device 104 may resend the authentication request because it did not receive a SAML assertion. Alternatively, for example, SP device 106 may send another authentication request in response to receiving another request from user device 102. IDP device 106 checks the password (PW1) of the new authentication request against the password(s) stored on attempt table 110 for the user. Because the IDP device 106 determines the new password to be a duplicate of the password on attempt table 110, IDP device 106 discards the authentication request and logs the attempt in, e.g., attempt table 110. Subsequently, SP device 104 may continue to generate the same authentication requests, and IDP device 106 may continue to block these requests having the same password.

While the example of FIG. 3 illustrated one user device 102, multiple user devices 102A and 102B may have the same, old password after a user changes the password of authentication device 108 stored in user credentials database 112. The user may only change the cached password of one user device 102A. The other user device(s) 102B, using the old password, may cause an entry for the corresponding user in attempt table 110. When one of the user devices 102A changes to the new, correct password, the new password will not match the entry in attempt table 110. So, IDP device 106 will permit the new password to be sent to authentication device 108, and the submitting client device will be granted access. Other authentication requests for the user that send the old password will be blocked until the cached passwords are changed.

In the illustrated example, the user may mistakenly change the password that that user device 102 uses to a different incorrect password (PW2). For example, the user may submit a different, incorrect password after noticing that the first password (PW1) was not valid. Because the subsequent authentication request includes a new password, IDP device 106 submits the authentication request to authentication device 108. This causes IDP device 106 to forward the password (PW2) to authentication device 108. Since the second password (PW2) is also incorrect, the authentication attempt fails (e.g., authentication device 108 sends a failure message). IDP device 106 stores the invalid password (PW2) in association with the username (e.g., or a hash thereof) in the attempt table 110. SP device 104 send another authentication request with the same password to IDP device 106. For example, SP device 104 may resend the authentication request because it did not receive a SAML assertion. Alternatively, for example, SP device 106 may send another authentication request in response to receiving another request from user device 102. IDP device 106 checks the password (PW2) of the new authentication request against the passwords (PW1 and PW2) stored on attempt table 110 for the user. Because the IDP device 106 determines the new password to be a duplicate of one of the passwords on attempt table 110, IDP device 106 discards the authentication request and logs the attempt in, e.g., attempt table 110. Subsequently, SP device 104 may continue to generate the same authentication requests, and IDP device 106 may continue to block these requests having the same password. The user may then change the password stored by user device 102 to be the correct password (PW3). In this example, authentication device 108 determines that the request is valid, because the password matches the password stored in user credentials database 112.

Figure 4:
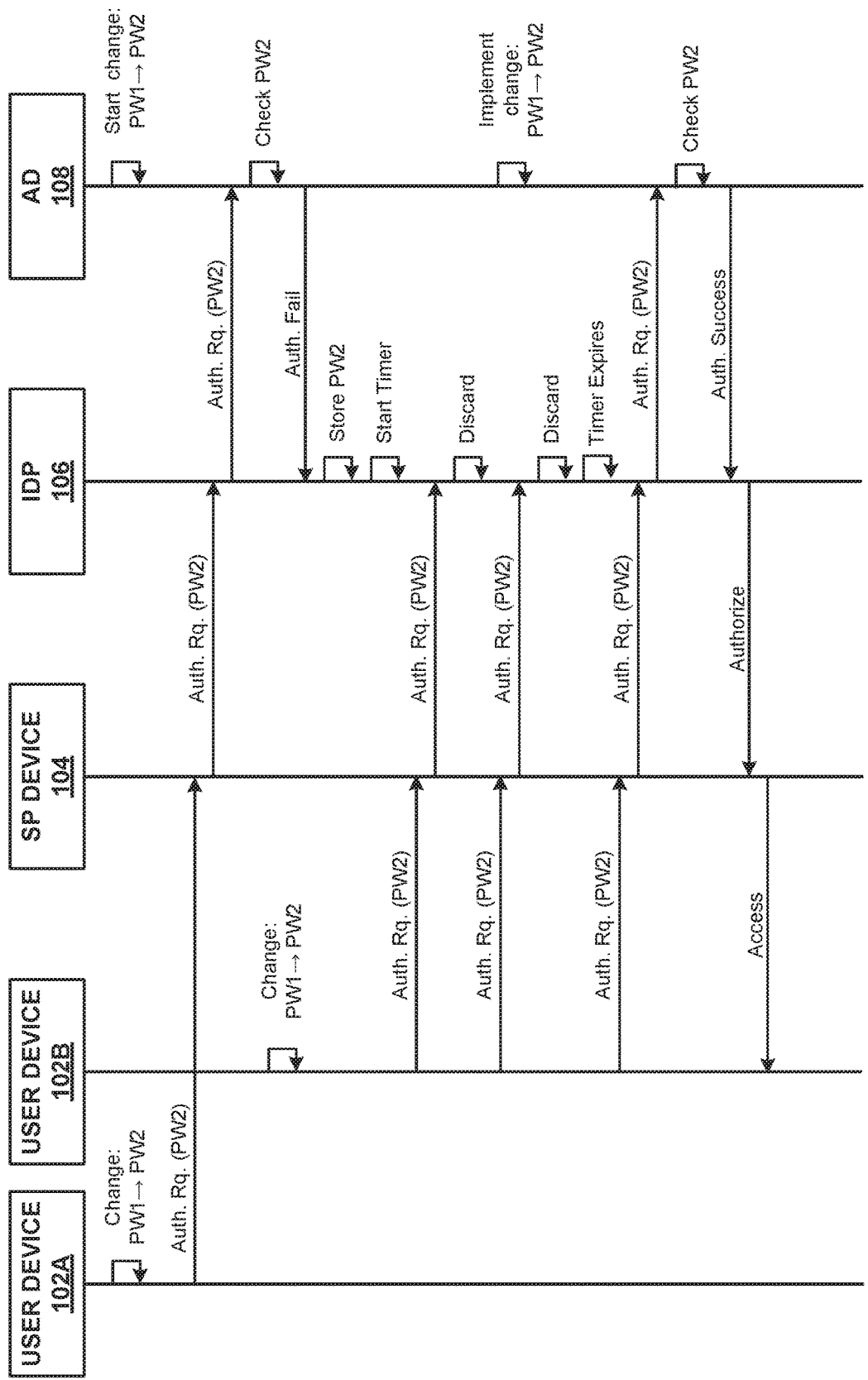
FIG. 4 is a block diagram illustrating an example of the network of FIG. 1 configured to perform the techniques of this disclosure in a third scenario.

FIG. 4 illustrates a scenario in which authentication device 108 updates a password for a user account relatively slowly and the user updates passwords on user devices 102A and 102B before the password has actually changed on authentication device 108 (e.g., in user credentials database 112). In the illustrated example, the password is change on user device 102A. User device 102A sends an authentication request with the new password (PW2). This causes IDP device 106 to forward the password (PW2) to authentication device 108. Because the new password (PW2) has not been updated in credentials database 112, the authentication attempt fails (e.g., authentication device 108 sends a failure message). IDP device 106 stores the allegedly invalid password in association with the username (e.g., or a hash thereof) in the attempt table 110. Additionally, in the illustrated example, IDP device 106 starts a timer associated with the incorrect password (PW2). Subsequently, the password stored by user device 102B is updated to the new password (PW2). User device 102B sends an authentication request with the new password (PW2). The SP device 106 forwards the authentication request. Because the new password (PW2) matches the old password in the attempt table 110, IDP device 106 does not forward the authentication request to authentication device 108. This may continue until the password in credentials database 112 updates to reflect the new password (PW2) and the time expires causing IDP 106 to delete the new password (PW2) from attempt table 110. Subsequently, when user device 102B sends an authentication request with the new password (PW2), authentication device 108 will authorize access.

Figure 5:
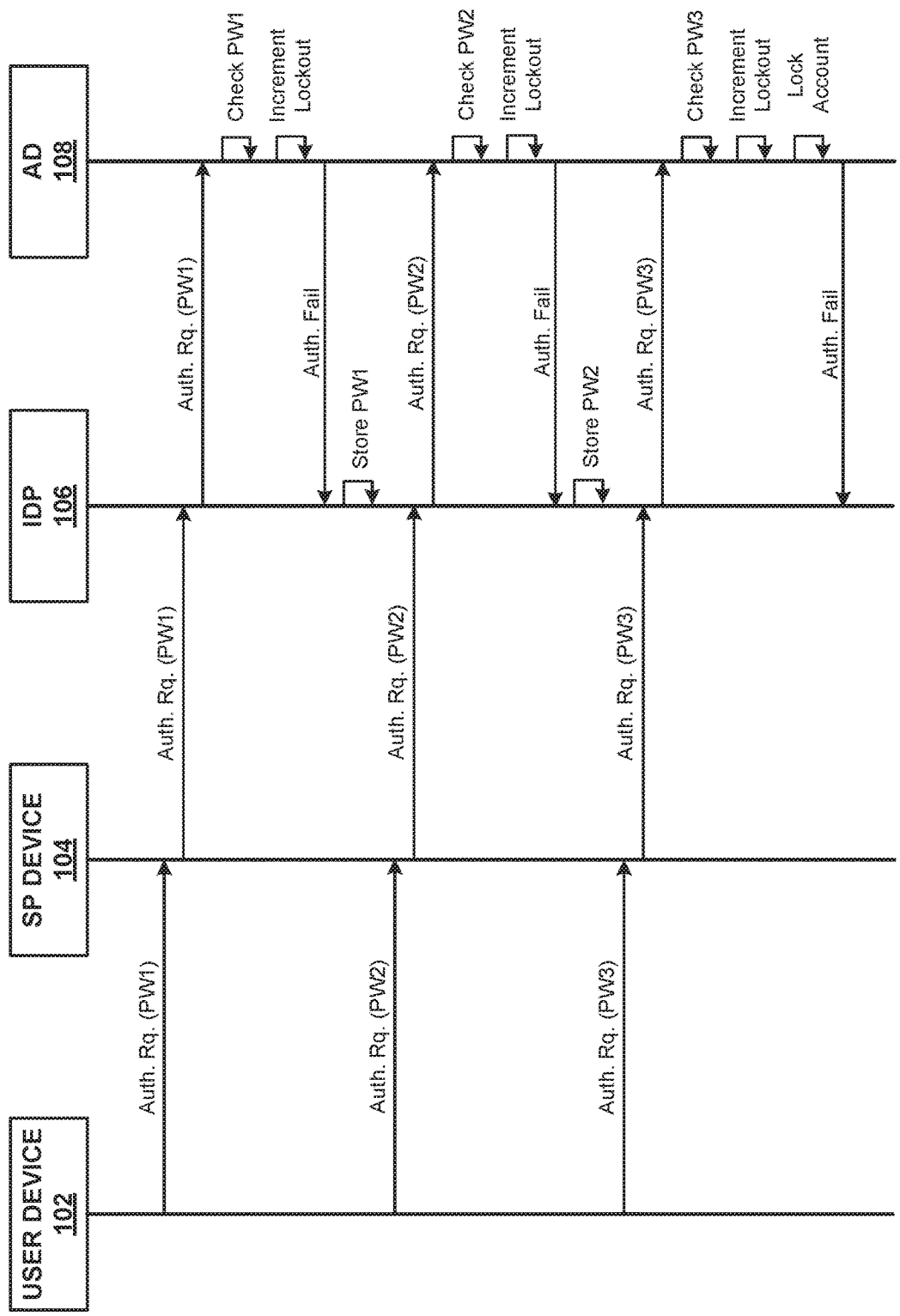
FIG. 5 is a block diagram illustrating an example of the network of FIG. 1 configured to perform the techniques of this disclosure in a third scenario.

FIG. 5 illustrates a scenario in which a brute force attack is perpetrated by a malicious actor. In this case, for the same username, IDP device 106 will receive multiple different passwords. So, for that user, IDP device 106 stacks each of the different passwords in entries of attempt table 110, and submits each of the different passwords to authentication device 108. In some cases, IDP device 106 may temporarily block attempts, e.g., allowing only up to five attempts per minute. In the illustrated example, IDP device 106 stores the various password attempts on attempt table 110. However, in a brute force attack, passwords are not generally repeated. Thus, IDP device 106 does not block any of the password attempts that include unique passwords. Accordingly, authentication device 108 may ultimately lockout the user account to which the attack is directed.

Figure 6:
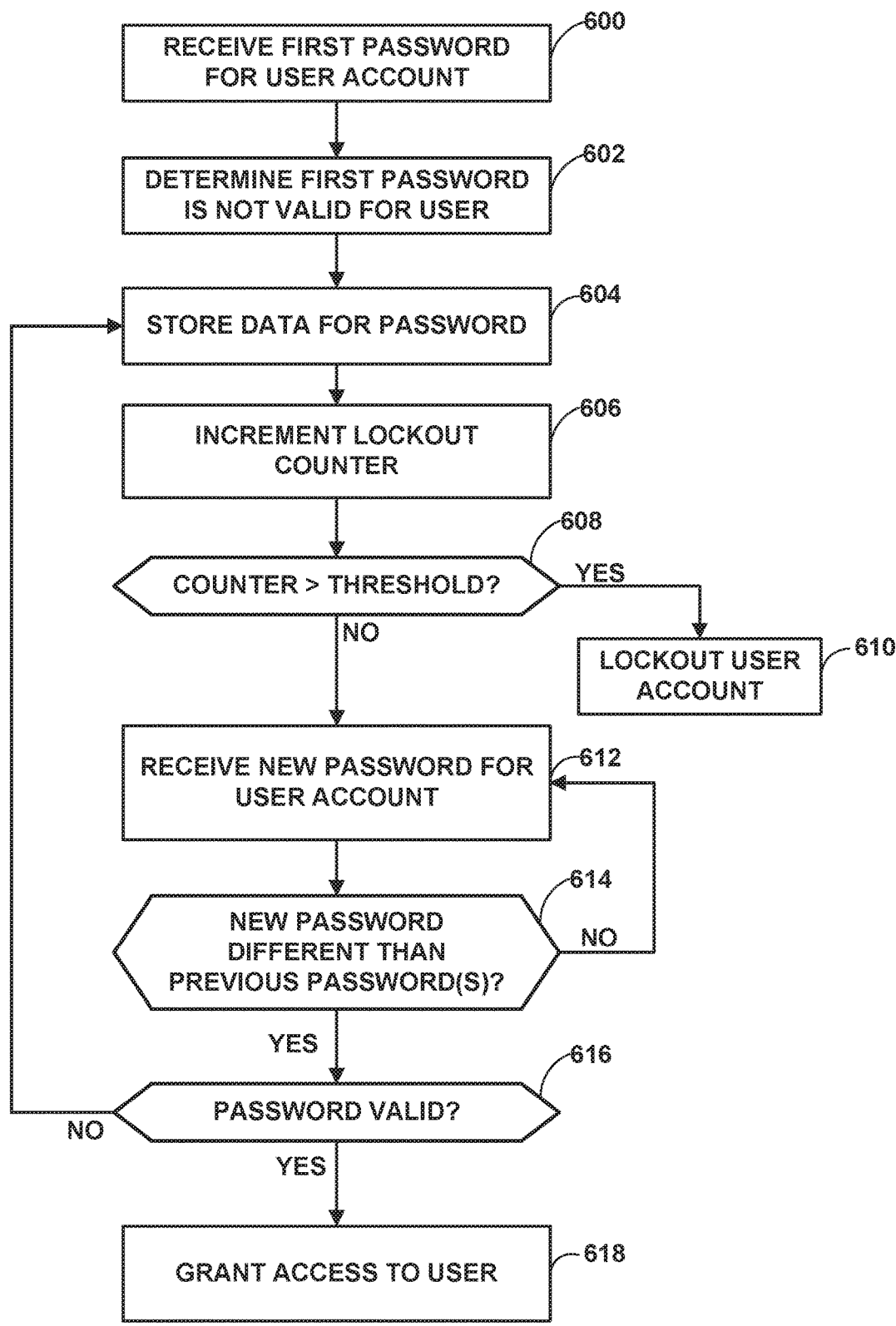
FIG. 6 is a flowchart illustrating an example method for performing techniques of this disclosure.

FIG. 6 is a flowchart illustrating an example method for performing techniques of this disclosure. For purposes of example, the method of FIG. 6 is explained with respect to IDP device 106 of FIG. 1. However, it should be understood that the method of FIG. 6 may be performed by other devices, such as user device 102, SP device 104, or authentication device 108 of FIG. 1, or another device involved in authenticating user credentials including a password.

Initially, in this example, IDP device 106 receives a first password for a user account (600). IDP device 106 determines that the first password is not valid for the user (602). For example, IDP device 106 may send the password, along with a username, to authentication device 108, and authentication device 108 may send data back to IDP device 106 indicating that the password is invalid. In other examples, IDP device 106 itself (or another device performing the method) may have access to data representative of the valid password to itself determine whether the password is valid.

IDP device 106 then stores data for the password (604), such as a salted hashed version of the password and a salt value used to generate the salted hashed version. IDP device 106 stores this data in attempt table 110. In the illustrated example, IDP device 106 also increment a lockout counter (606). The lockout counter may be maintained by IDP device 106 itself, or by a separate device, such as authentication device 108. Submitting an invalid password to authentication device 108 may cause authentication device 108 to increment a lockout counter maintained by authentication device 108.

IDP device 106 (or authentication device 108) determines whether the lockout counter is greater than a threshold value (608). If the lockout counter exceeds the threshold value ("YES" branch of 608), IDP device 106 or authentication device 108 performs a lockout on the user account (610). However, if the lockout counter does not exceed (i.e., is less than or equal to) the threshold ("NO" branch of 608), IDP device 106 waits for a subsequent authentication attempt.

After receiving a new password for the same user account (612), IDP device 106 determines whether the new password is different than one or more previous passwords attempted for the user account (614). For example, IDP device 106 may hash the new password with salt values associated with the previous passwords to generate salted hashed versions of the new password, and compare each of the salted hashed versions of the new password with the stored salted hashed passwords stored in attempt table 110. If the new password is not different than (i.e., is the same as) at least one of the previous passwords ("NO" branch of 614), IDP device 106 avoids incrementing the lockout counter (e.g., directly, or by preventing sending of the new password to authentication device 108) and again awaits a new password.

However, if the new password is different than each of the previous passwords ("YES" branch of 614), IDP device 106 may determine whether the password is valid (616). For example, IDP device 106 may send the password to authentication device 108. If the new password is not valid ("NO branch of 216), IDP device 106 may store a salted hashed version of the new password (604) and authentication device 108 may increment the lockout counter (606). However, if the new password is valid ("YES" branch of 616), IDP device 106 may grant access to serves to the user (618). For example, IDP device 106 may indicate one or more services that SP device 104 may provide to the user.

In this manner, the method of FIG. 6 represents an example of a method including determining that a received first password for a user account is not valid for the user account; in response to determining that the first password is not valid, incrementing a lockout counter associated with the user account; determining that a received second password for the user account is the same as the first password; and in response to determining that the second password is the same as the first password, preventing incrementing of the lockout counter.

The method of FIG. 6 also represents an example of a method including sending a first password for a user account to an authentication device; determining that the authentication device indicated that the first password is not valid for the user account; determining that a received second password for the user account is the same as the first password; and in response to determining that the second password is the same as the first password, preventing sending of the second password to the authentication device.

Figure 7:
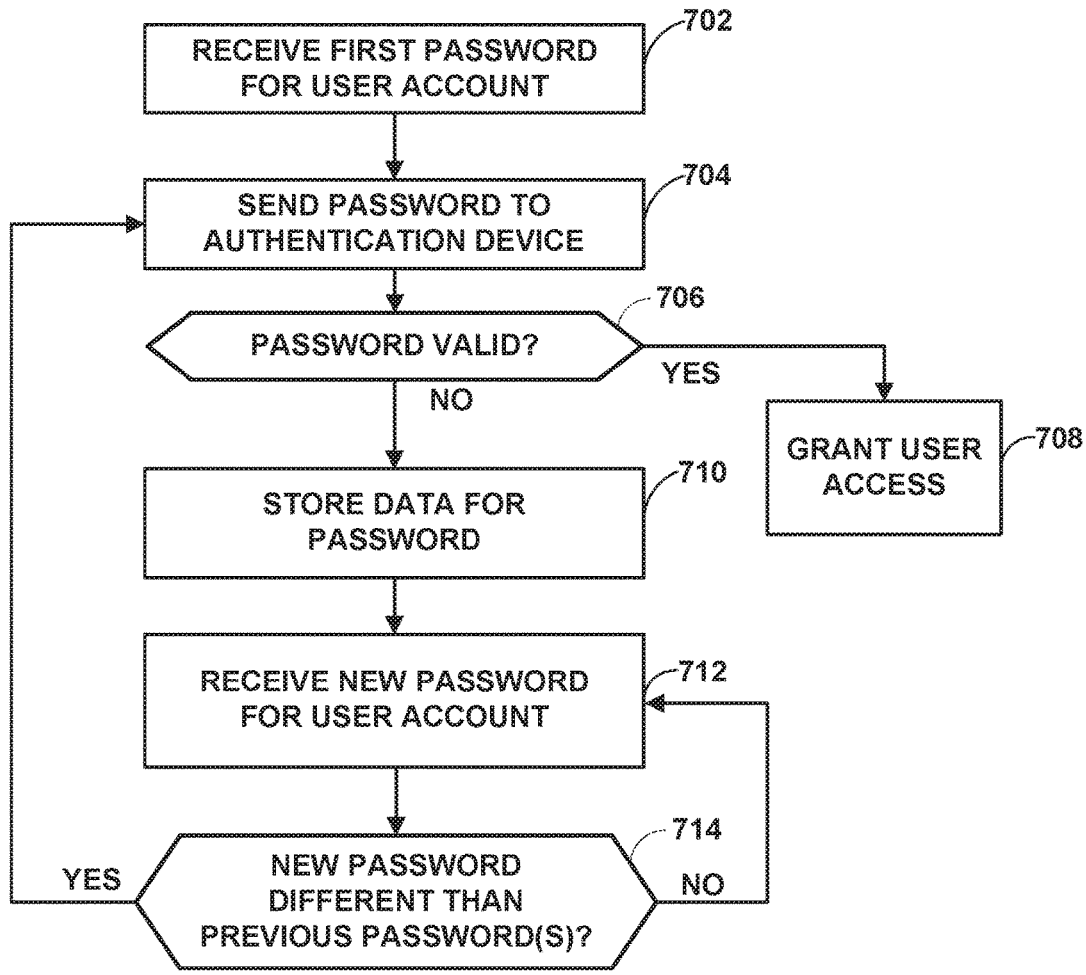
FIG. 7 is a flowchart illustrating an example of a method for performing techniques of this disclosure.

FIG. 7 is a flowchart illustrating an example of a method for performing techniques of this disclosure. For purposes of example, the method of FIG. 7 is explained with respect to IDP device 106 of FIG. 1. However, it should be understood that the method of FIG. 7 may be performed by other devices, such as user device 102 or SP device 104 of FIG. 1, or another device involved in authenticating user credentials including a password.

In the example of FIG. 7, IDP device 106 initially receives a first password for a user account (702). IDP device 106 sends the password to authentication device 108 (704). IDP device 106 then determines whether the password is valid (706), e.g., based on a response from authentication device 108. When the response indicates that the password is valid ("YES" branch of 706), IDP device 106 grants the user access (708).

Otherwise, when the response indicates that the password is not valid ("NO" branch of 706), IDP device 106 stores data for the first password (710), e.g., in attempt table 110. As disclosed above, such data may include a salted hashed version of the password, as well as a salt value used to generate the salted hashed version. IDP device 106 subsequently receives a new password for the user account (712). IDP device 106 determines whether the new password is different than one or more previous passwords attempted for the user account (714). For example, IDP device 106 may hash the new password with salt values associated with the previous passwords to generate salted hashed versions of the new password, and compare each of the salted hashed versions of the new password with the stored salted hashed passwords stored in attempt table 110. When the new password is not different than (i.e., is the same as) at least one of the previous passwords ("NO" branch of 714), IDP device 106 does not send the password to authentication device 108. However, when the new password is different than the previous passwords for the user account ("YES" branch of 714), IDP device 106 sends the password to authentication device 108 (704). In some examples, authentication device 108 performs a lockout of the user account if too many invalid password attempts are made.

In this manner, the method of FIG. 7 represents an example of a method including sending a first password for a user account to an authentication device; determining that the authentication device indicated that the first password is not valid for the user account; determining that a received second password for the user account is the same as the first password; and in response to determining that the second password is the same as the first password, preventing sending of the second password to the authentication device.

Although generally described with respect to preventing false positive lockouts of individual user accounts in response to duplicated password attempts, the techniques of this disclosure may be used to prevent false positive lockouts in other scenarios as well. For example, some systems lock out source IP addresses, ranges of source IP addresses, geographic locations inferred from IP addresses, or other elements such as HTTP attributes "X-Forwarded-For" or "User Agent." The techniques of this disclosure may be used to prevent false positive lockouts in any of these scenarios as well.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The terms "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method, comprising:
   receiving, by an identity provider device (IPD) and from a service provider device, a first password for a user account;
   in response to receiving the first password, forwarding, by the IPD, the first password to an authentication device;
   determining, by the IPD, that the first password is not valid for the user account;
   in response to determining that the first password is not valid, incrementing, by the IPD, a lockout counter associated with the user account, wherein the lockout counter is configured to initiate a lock of the user account when a threshold number of wrong password attempts has been exceeded; and the incrementing includes sending data representative of the first password to the authentication device to cause the authentication device to increment the lockout counter;
   storing, by the IPD, the first password in association with the user account in an attempt table of the IPD;
   determining, by the IPD, that a received second password for the user account matches the first password in the attempt table;
   in response to determining that the received second password matches the first password, avoiding, by the IPD, communication of the received second password to the authentication device to reduce processing an Enhanced Client or Proxy (ECP) request based on the received second password by the authentication device and reduce false positive lockouts of the user account; and
   in response to determining that the received second password does not match the first password, forwarding, by the IPD, the received second password to the authentication device such that an ECP request based on the received second password is implemented by the authentication device and the lockout counter is incremented.

2. The method of claim 1, further comprising:
   determining that a received third password for the user account is different than the first password, and that the received third password is not valid for the user account;
   in response to determining that the received third password is not valid, incrementing the lockout counter;
   determining that a received fourth password for the user account matches one of the first password or the received third password; and
   in response to determining that the received fourth password matches the first password or the received third password, preventing incrementing of the lockout counter.

3. The method of claim 2, further comprising:
   performing a first salted hash on the first password to generate a first salted hashed password;
   storing the first salted hashed password and a first salt value for the first salted hashed password;
   performing a second salted hash on the received third password to generate a second salted hashed password;
   storing the second salted hashed password and a second salt value for the second salted hashed password;
   wherein determining that the received fourth password matches one of the first password or the received third password comprises:
      performing a third salted hash on the received fourth password using the first salt value to generate a third salted hashed password;
      performing a fourth salted hash on the received fourth password using the second salt value to generate a fourth salted hashed password; and
      determining that one of the third salted hashed password matches the first salted hashed password or the fourth salted hashed password matches the second salted hashed password.

4. The method of claim 1, wherein determining that the first password is not valid comprises:
   receiving, from the authentication device, data indicating that the first password is not valid.

5. The method of claim 1:
   wherein the lockout counter is controlled by the authentication device.

6. A server operating to provide a single sign on service for multiple service provider devices, the server comprising:
   a non-transitory memory storing an attempt table; and
   one or more processors implemented in circuitry and configured to:
      in response to receiving a first password for a user account from a first service provider device of the multiple service provider devices, forward the first password to an authentication device;
      determine that the received first password is not valid for the user account;
      in response to a determination that the first password is not valid, increment a lockout counter associated with the user account, wherein the lockout counter is configured to initiate a lock of the user account when a threshold number of wrong password attempts has been exceeded; and the incrementing including sending data representative of the first password to the authentication device to cause the authentication device to increment the lockout counter;

store data representative of the first password in association with the user account in the attempt table;

in response to receiving a second password for the user account, determine whether the second password matches the first password in the attempt table;

in response to a determination that the second password matches the first password, avoid communication of the second password to the authentication device to reduce processing an Enhanced Client or Proxy (ECP) request based on the second password by the authentication device and reduce false positive lockouts of the user account; and in response to the second password not matching the first password, forward the second password to the authentication device such that an ECP request based on the second password is implemented by the authentication device and the lockout counter is incremented.

7. The server of claim 6, wherein the one or more processors are further configured to:

in response to storing the first password in association with the user account in the attempt table, start a timer; and when the timer expires, delete the first password from the attempt table.

8. The server of claim 7, wherein the one or more processors are further configured to, in response to receiving, after the timer has expired, a third password for the user account that matches the first password, forward the third password to the authentication device.

9. The server of claim 6, wherein the first password originates from a first user device and the second password originates from a second user device.

10. The server of claim 6, wherein to store the first password, the one or more processors are further configured to:

generate a first hash of the first password with a first salt value; and store the first hash and the first salt value in association with the user account in the attempt table.

11. The server of claim 10, wherein to determine whether the second password matches the first password, the one or more processors are further configured to:

generate a second hash of the second password with the first salt value; and determine that the second password matches the first password when the second hash matches the first hash.

12. The server of claim 6, wherein the one or more processors are further configured to:

in response to receiving a third password for the user account, determine whether the third password matches the first password;

in response to the third password not matching the first password, forward the third password to the authentication device;

determine that the third password is not valid for the user account; and store the third password in association with the user account in the attempt table.

13. The server of claim 12, wherein the one or more processors are further configured to:

in response to receiving a fourth password for the user account, determine whether the fourth password matches either the first password or the third password; and when the fourth password does not match either one of the first password or the third password, forward the fourth password to the authentication device.

14. A non-transitory computer readable medium comprising instructions that, when executed, cause a server to:

in response to receiving, from a service provider device, a first password for a user account, forward the first password to an authentication device;

determine that the first password is not valid for the user account;

in response to a determination that the first password is not valid, increment a lockout counter associated with the user account, wherein the lockout counter is configured to initiate a lock of the user account when a threshold number of wrong password attempts has been exceeded; and the incrementing includes sending data representative of the first password to the authentication device to cause the authentication device to increment the lockout counter;

store data representative of the first password in association with the user account in an attempt table that is stored on the server;

in response to receiving a second password for the user account, determine whether the second password matches the first password in the attempt table;

in response to a determination that the second password matches the first password, avoid communication of the second password to the authentication device to reduce processing an Enhanced Client or Proxy (ECP) request based on the second password by the authentication device and reduce false positive lockouts of the user account; and in response to the second password not matching the first password, forward the second password to the authentication device such that an ECP request based on the second password is implemented by the authentication device and the lockout counter is incremented.

15. The computer readable medium of claim 14, wherein the instructions further cause the server to:

in response to storing the first password in association with the user account in the attempt table, start a timer; and when the timer expires, delete the first password from the attempt table.

16. The computer readable medium of claim 15, wherein the instructions further cause the server to, in response to receiving, after the timer has expired, a third password for the user account that matches the first password, forward the third password to the authentication device.

17. The computer readable medium of claim 14, wherein to store the first password, the instructions further cause the server to:

generate a first hash of the first password with a first salt value; and store the first hash and the first salt value in association with the user account in the attempt table.

18. The computer readable medium of claim 17, wherein to determine whether the second password matches the first password, the instructions further cause the server to:

generate a second hash of the second password with the first salt value; and determine that the second password matches the first password when the second hash matches the first hash.

19. The computer readable medium of claim 14, wherein the instructions further cause the server to:

in response to receiving a third password for the user account, determine whether the third password matches the first password;

in response to the third password not matching the first password, forward the third password to the authentication device;

determine that the third password is not valid for the user account; and store the third password in association with the user account in the attempt table.

20. The computer readable medium of claim 19, wherein the instructions further cause the server to:

in response to receiving a fourth password for the user account, determine whether the fourth password matches either the first password or the third password; and when the fourth password does not match either one of the first password or the third password, forward the fourth password to the authentication device.

* * * * *